(12) United States Patent
Lee et al.

(10) Patent No.: US 12,423,771 B2
(45) Date of Patent: Sep. 23, 2025

(54) MULTI-SCALE AUTOENCODER GENERATION METHOD, ELECTRONIC DEVICE AND READABLE STORAGE MEDIUM

(71) Applicant: HON HAI PRECISION INDUSTRY CO., LTD., New Taipei (TW)

(72) Inventors: Wan-Jhen Lee, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 676 days.

(21) Appl. No.: 17/896,650

(22) Filed: Aug. 26, 2022

(65) Prior Publication Data

US 2023/0401670 A1 Dec. 14, 2023

(30) Foreign Application Priority Data

Jun. 9, 2022 (CN) .......................... 202210654040.2

(51) Int. Cl.
*G06T 3/40* (2024.01)
*G06N 3/08* (2023.01)
(Continued)

(52) U.S. Cl.
CPC ............... *G06T 3/40* (2013.01); *G06N 3/08* (2013.01); *G06T 7/0002* (2013.01);
(Continued)

(58) Field of Classification Search
CPC ............... G06T 3/40; G06T 7/0002; G06T 2207/20081; G06T 2207/20084;
(Continued)

(56) References Cited

U.S. PATENT DOCUMENTS

2019/0244513 A1* 8/2019 Niculescu-Mizil ........................ G06V 10/764
2022/0108434 A1* 4/2022 Donahue .............. G06V 10/751
(Continued)

FOREIGN PATENT DOCUMENTS

TW 202042111 11/2020
TW I762193 4/2022

*Primary Examiner* — Michael P LaPage
(74) *Attorney, Agent, or Firm* — ScienBiziP, P.C.

(57) ABSTRACT

A multi-scale autoencoder generation method applied to an electronic device is provided. The method includes acquire product images and acquire an annotation of each product image. Latent spaces of a plurality of scales are constructed. Autoencoders are obtained according to the latent spaces and an image size of the product image. Learners are obtained by training each autoencoder based on non-defective images. Reconstructed images are obtained by inputting the product images into the learners. Detection results are obtained by detecting whether each product image has defects according to the reconstructed images. Similar images for each learner are determined based on a comparison result between each detection result and a corresponding annotation result. Once a correct rate of each learner is obtained according to the similar images, a learner from the plurality of learner is determined as a multi-scale autoencoder according to the correct rate of each learner.

20 Claims, 3 Drawing Sheets

(51) Int. Cl.
*G06T 7/00* (2017.01)
*G06V 10/74* (2022.01)
*H04N 19/33* (2014.01)
*H04N 19/60* (2014.01)

(52) U.S. Cl.
CPC .......... *G06V 10/761* (2022.01); *H04N 19/33* (2014.11); *H04N 19/60* (2014.11)

(58) Field of Classification Search
CPC ........ H04N 19/33; H04N 19/60; Y02P 90/30; G06N 3/08; G06V 10/32; G06V 10/761; G06V 10/82
See application file for complete search history.

(56) References Cited

U.S. PATENT DOCUMENTS

| | | | |
|---|---|---|---|
| 2023/0267600 A1* | 8/2023 | Qu | G06N 3/088 |
| 2023/0410285 A1* | 12/2023 | Okuno | G06T 7/001 |
| 2024/0193760 A1* | 6/2024 | Fukuda | H01L 22/00 |
| 2024/0273708 A1* | 8/2024 | Miyamoto | G06T 7/001 |
| 2025/0104210 A1* | 3/2025 | Pu | G03F 7/706841 |

* cited by examiner

MULTI-SCALE AUTOENCODER GENERATION METHOD, ELECTRONIC DEVICE AND READABLE STORAGE MEDIUM

FIELD

The present disclosure relates to image processing technology, in particular to a multi-scale autoencoder generation method, an electronic device, and a readable storage medium.

BACKGROUND

Generally, a size of a feature map generated by an autoencoder may be too large or too small, resulting in a low degree of fineness of a reconstructed image, which causes the reconstructed image to be dissimilar to an original input image.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
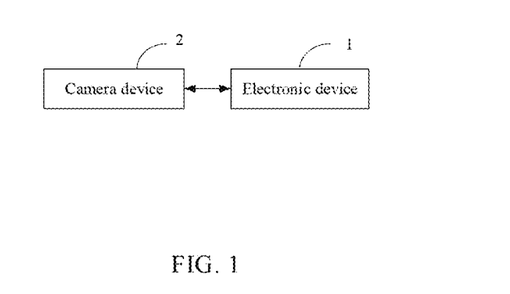
FIG. 1 is an application environment diagram of an embodiment of the multi-scale autoencoder generation method of the present disclosure.

FIG. 1 is an application environment diagram of one embodiment of a method for generating a multi-scale autoencoder of the present disclosure. The method for generating the multi-scale autoencoder can be applied to at least one electronic device 1. The electronic device 1 can communicate with a camera device 2, and the camera device 2 may be a camera or other device for capturing images. For example, the camera device 2 can take images of a plurality of products which have defects and obtain a plurality of images (hereinafter named as "defective images"). The camera device 2 can take images of a plurality of products which have no defects and obtain a plurality of images (hereinafter named as "non-defective images"). With or without defects, the products may be devices such as mobile phones, computer hosts, or other suitable devices.

The electronic device 1 is a device that can automatically perform numerical calculation and/or information processing according to pre-set or stored instructions, and its hardware includes, but is not limited to, a microprocessor, an application specific integrated circuit (ASIC), a field-programmable gate array (FPGA), a digital signal processor (DSP), an embedded equipment, and so on.

The electronic device 1 can be any electronic product that can interact with a user. For example, the electronic device 1 can be a personal computer, a tablet computer, a smart phone, a personal digital assistant (PDA), a game console, and an internet protocol television (IPTV), a smart wearable device, etc.

The electronic device 1 may also include network equipment and/or user equipment. Wherein, the network device includes, but is not limited to, a network server, a server group formed by a plurality of network servers, or a cloud formed by a large number of hosts or network servers based on cloud computing.

The network where the electronic device 1 is located includes, but is not limited to, the Internet, a wide area network, a metropolitan area network, a local area network, a virtual private network (VPN), and the like.

Figure 2:
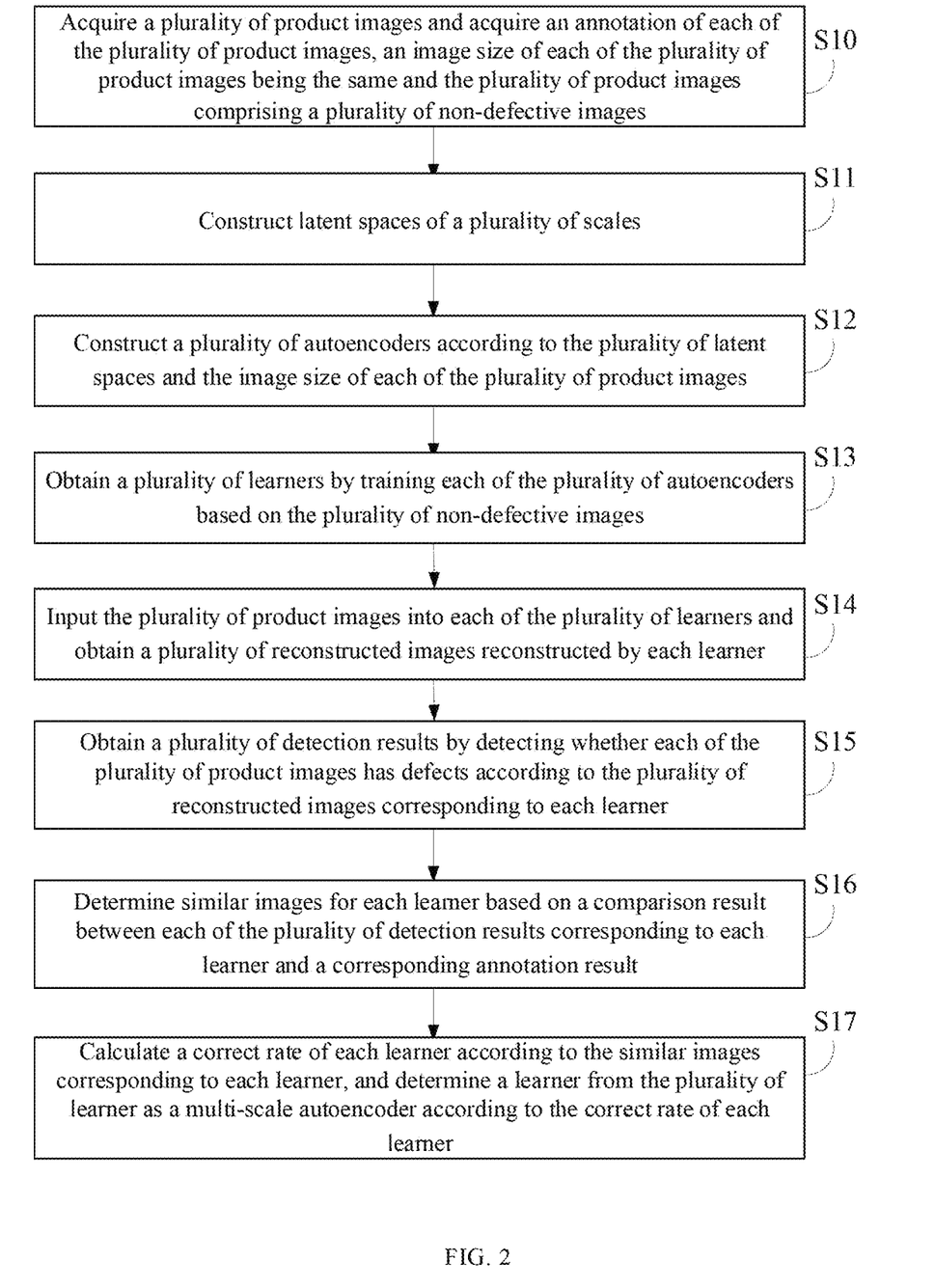
FIG. 2 is a flowchart of an embodiment of a method for generating a multi-scale autoencoder of the present disclosure.

FIG. 2 is a flowchart of one embodiment of the method for generating the multi-scale autoencoder of the present disclosure. According to different requirements, a sequence of each block in this flowchart can be adjusted according to actual requirements, and some blocks can be omitted. The execution body of this method can be an electronic device, such as the electronic device 1 shown in FIG. 4.

At block S10, the electronic device acquires a plurality of product images and acquires a result of annotation (hereinafter named as "annotation result") of each of the plurality of product images, a size (hereinafter named as "image size") of each of the plurality of product images is the same and the plurality of product images includes a plurality of non-defective images and defective images.

In at least one embodiment, the product images refers to images of products, the products include defective products and non-defective products. For example, it is assumed that the products are cups, then the defective products may be cups with color difference. If the products are toys, then defective products may be toys with scratches.

In at least one embodiment, the annotation result of each of the plurality of product images indicates that the product in each product image has defects or has no defects.

In at least one embodiment, the acquiring of the plurality of product images and the acquiring of the annotation result of each of the plurality of product images include:

Obtaining the plurality of product images by controlling the camera device to capture images of the plurality of defective products at a first position and a first angle, and controlling the camera device to capture images of the plurality of non-defective products at the first position and the first angle (i.e., the camera device can be controlled to capture the plurality of product images at a same position and a same angle); and Obtaining the annotation result of each product image from a predetermined database.

The electronic device pre-stores the annotation result of each product image in predetermined database.

At block S11, the electronic device constructs latent spaces of a plurality of scales.

In at least one embodiment, each latent space refers to a space where extracted image features exist.

In at least one embodiment, the plurality of scales may include 4*4, 8*8, and 16*16.

In at least one embodiment, the constructing of the latent spaces of the plurality of scales:

Setting the plurality of scales, and obtaining the latent spaces of the plurality of scales by constructing each of the plurality of latent spaces according to one of the plurality of scales.

At block S12, the electronic device constructs a plurality of autoencoders according to the plurality of latent spaces and the image size of each of the plurality of product images.

In at least one embodiment, the image size of each product image refers to a total number of pixel points included in a horizontal direction and in a vertical direction in each product image. The image size of each product image may be 128*128 or 256*256.

In at least one embodiment, the constructing of the plurality of autoencoders according to the plurality of latent spaces and the image size of each of the plurality of product images includes:

Iteratively calculating a ratio between the image size and a first preset value, until a plurality of operation results equivalent to the plurality of scales are obtained, each of the plurality of operation results is equivalent to one of the plurality of scales; counting a total number of iterations performed for obtaining each of the operation results, establishing a correspondence between each of the operation results and the total number of iterations performed for obtaining each of the operation results; for each of the plurality of scales, constructing a first preset number of hidden layers as an encoder (encoder network), constructing a second preset number of operation layers as a decoder (decoder network), thereby obtaining a plurality of encoder networks and a plurality of decoder networks, the first preset number being equal to the second preset number, the first preset number and the second preset number being equal to the corresponding total number of iterations; and generating the plurality of autoencoders according to each of the plurality of encoder networks, each of the decoder network, and each of the latent spaces.

Wherein, the first preset value can be 2, or 4.

The iteratively calculating of the ratio between the image size and the first preset value, until the plurality of operation results equivalent to the plurality of scales being obtained includes:

Obtaining an operation result by dividing the image size and the first preset value; if the operation result is different from any scale of the plurality of scales, determining the operation result as the image size (hereinafter named as "updated image size") in a next iteration, and dividing the updated image size with the first preset value until the operation result is the same as one of the plurality of scales. By performing the iterations of calculation, the electronic device can obtain the plurality of operation results that are respectively equivalent to the plurality of scales. For example, if there are three scales, the electronic device can separately perform the iterations of calculation for each scale. Taking a scale A as an example, in a process of performing the iterations of calculation, when an operation result equivalent to scale A is obtained, the iteration is end, and a total number of iterations performed for obtaining the operation result equivalent to scale A is determined. Wherein, a plurality of the operation results obtained in the process of performing the iterations of calculation are set as sizes of feature maps generated by the encoder network, which is generated based on the scale A.

It can be understood that the process of generating the encoder network and the process of generating the decoder network are mutually reversible, and the process of generating the decoder network is not described in detail in this disclosure.

Figure 3:
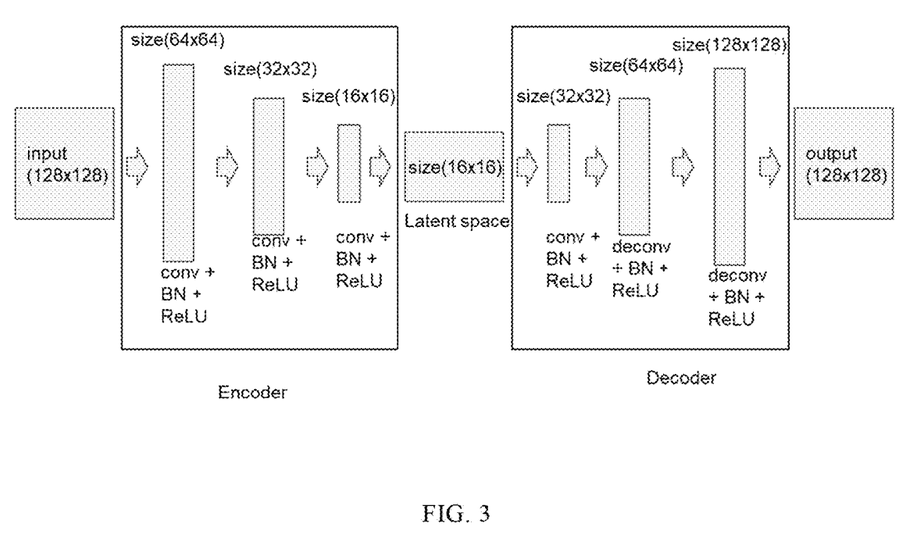
FIG. 3 is a schematic structural diagram of an autoencoder according to an embodiment of the method for generating the multi-scale autoencoder of the present disclosure.

As shown in FIG. 3, it is a schematic structural diagram of an autoencoder according to a preferred embodiment of the present disclosure. Assuming that the image size is 128*128, the scale of the latent space is 16*16, and the first preset value is 2. The electronic device performs a first division operation based on the image size and the first preset value, and obtains a first operation result 64*64; performs a second division operation based on the first operation result and the first preset value, and obtains a second operation result 32*32; performs a third division operation based on the second operation result and the first preset value, and obtains a third operation result 16*16. Because the third operation result 16*16 is the same as the scale of the latent space 16*16, the iteration is end, the electronic device counts the total number of division operations as 3, and constructs an encoder network having three hidden layers, and sets the first operation result 64*64 as a size of a feature map output by a first hidden layer of the encoder network, sets the second operation result 32*32 as a size of a feature map output by a second hidden layer of the encoder network, and sets the third operation result 16*16 as a size of a feature map output by a third hidden layer of the encoder network. After the above construction, an autoencoder is obtained. The autoencoder includes the encoder network, a latent space with a scale of 16*16, and a decoder network. The encoder network includes three hidden layers, wherein the first hidden layer outputs the size of the feature map of the first operation result is 64*64, the size of the feature map output by the second hidden layer is the second operation result 32*32, and the size of the feature map output by the third hidden layer is the third operation result 16*16; the decoder network includes three operation layers, wherein the size of the feature map output by the first operation layer of the decoder network is 32*32, and the size of the feature map output by the second operation layer of the decoder network is 64*64, and the size of the feature map output by the third operation layer of the decoder network is 128*128.

Through the above implementation, the size of the feature map generated by the corresponding hidden layer in each autoencoder is set as the corresponding division result, so that the size of the feature map generated by each autoencoder can be controlled, and the feature map can be avoided from being too large, or too small, etc., thereby improving a fineness of extracted image features by each autoencoder.

In at least one embodiment, each of the first preset number of hidden layers is composed of a convolution layer, a batch normalization layer, and an activation function layer in sequence, and each of the second preset number of operation layers is composed of a deconvolution layer, the batch normalization layer, and the activation function layer in sequence.

At block S13, the electronic device obtains a plurality of learners by training each of the plurality of autoencoders based on the plurality of non-defective images.

In at least one embodiment, each of the plurality of learners refers to an autoencoder that has been trained using the plurality of non-defective images, the plurality of learners can be used to reconstruct images.

In at least one embodiment, the obtaining of the plurality of learners by training each of the plurality of autoencoders based on the plurality of non-defective images includes:

Calculating a value of a loss function (hereinafter named as "loss function value") of each autoencoder, and obtaining the plurality of learners by performing gradient backpropagation on each autoencoder according to the loss function value, until the loss function value decreases to a lowest value.

Through the above-mentioned embodiment, each autoencoder can be trained by using the plurality of non-defective images and the plurality of learners can be obtained quickly.

Specifically, the calculating of the loss function value of each autoencoder includes:

Obtaining a plurality of output images by inputting the plurality of non-defective images into each autoencoder, and calculating the loss function value according to each of the plurality of non-defective image and the corresponding output image.

A calculation formula of the loss function value is:

$$MSE = \frac{\sum_{j=1}^{M}(m_j - n_j)^2}{M};$$

wherein, MSE represents the loss function value, M represents a total number of pixel points in each of the plurality of non-defective images, j represents a constant, $m_j$ represents a pixel value of the jth pixel point in each of the plurality of non-defective images, and $n_j$ represents the pixel value of the jth pixel point in the corresponding output image.

At block S14, the electronic device inputs the plurality of product images into each of the plurality of learners and obtains a plurality of images (hereinafter named as "reconstructed images") reconstructed by each learner. The electronic device establishes a correspondence between the plurality of reconstructed images and each learner.

In at least one embodiment, each of the plurality of reconstructed images refer to an image reconstructed according to each product image, and the plurality of reconstructed images reconstructed by each learner can be used to detect whether the plurality of product images have defects.

In at least one embodiment, the inputting of the plurality of product images into each of the plurality of learners and the obtaining of the plurality of reconstructed images includes:

Inputting each of the plurality of product images into the hidden layers of each learner for feature extraction, and obtaining the feature vector output by each hidden layer, wherein the feature vector output by each hidden layer is an input vector of a next hidden layer; determining a feature vector output by a last hidden layer as a latent vector corresponding to each product image; inputting the latent vector to the operation layers of each learner for reconstruction, and obtaining a reconstructed vector output by each operation layer, wherein the reconstruction vector output by each operation layer is an input vector of a next operation layer; and obtaining the plurality of reconstructed images by performing a mapping processing on each reconstruction vector output by a last operation layer.

Wherein, the latent vector is stored in the corresponding latent space, and the corresponding latent space includes a plurality of latent vectors.

Through the above implementation, the plurality of reconstructed images can be obtained. Since each learner has learned the features of the plurality of non-defective images, the plurality of reconstructed images can serve as non-defective images in subsequent operations.

At block S15, the electronic device obtains a plurality of detection results by detecting whether each of the plurality of product images has defects according to the plurality of reconstructed images corresponding to each learner. The electronic device establishes a correspondence between each learner and the plurality of detection results, and establishes a correspondence between each of the plurality of detection results and each product image.

In at least one embodiment, each of the plurality of detection results indicates that the corresponding product image is defective or non-defective.

In at least one embodiment, the obtaining of the plurality of detection results by detecting whether each of the plurality of product images has defects according to the plurality of reconstructed images corresponding to each learner including:

Calculating a value of similarity (hereinafter named as "similarity value") between each of the plurality of reconstructed images and the corresponding product image.

A calculation formula of the similarity value is:

$$SSIM(x, y) = \frac{(2\mu_x\mu_y + c_1)(2\sigma_{xy} + c_2)}{(\mu_x^2 + \mu_x^2 + c_1)(\sigma_x^2 + \sigma_y^2 + c_2)};$$

$$c_1 = (K_1 L)^2;$$

$$c_2 = (K_2 L)^2;$$

Wherein, SSIM(x, y) represents the similarity value, x represents the reconstructed image, y represents the corresponding product image, $\mu_x$ represents an average grayscale value of the reconstructed image, $\mu y$ represents an average grayscale value of the corresponding product image, $\sigma_x$ represents a grayscale standard deviation of the reconstructed image, $\sigma_y$ represents a grayscale standard deviation of the corresponding product image, and $\sigma_{xy}$ represents a grayscale value covariance between the reconstructed image and the corresponding product image, $c_1$ and $c_2$ represent parameters that maintain a denominator in the similarity value not to be zero, L represents a maximum pixel value of the pixel points in the corresponding product image, $K_1$ and $K_2$ represent preset constants, and $K_1 < 1$, $K_2 < 1$.

If the similarity value is greater than a second preset value, the electronic device determines that the corresponding product image has no defects; and if the similarity value is less than or equal to the second preset value, the electronic device determines that the corresponding product image has defects.

Specifically, a calculation formula of calculating the average grayscale value of the reconstructed image is:

$$\mu_x = \frac{1}{N}\sum_{i=1}^{N} x_i;$$

A calculation formula of calculating the average grayscale value of the corresponding product image is:

$$\mu_y = \frac{1}{N}\sum_{i=1}^{N} y_i;$$

mA calculation formula of calculating the grayscale standard deviation of the reconstructed image is:

$$\sigma_x = \left(\frac{1}{N-1}\sum_{i=1}^{N}(x_i - \mu_x)\right)^{\frac{1}{2}};$$

A calculation formula of calculating the grayscale standard deviation of the corresponding product image is:

$$\sigma_y = \left(\frac{1}{N-1}\sum_{i=1}^{N}(y_i - \mu_y)\right)^{\frac{1}{2}};$$

A calculation formula of calculating the grayscale value covariance between the reconstructed image and the corresponding product image is:

$$\sigma_{xy} = \frac{1}{N-1}\sum_{i=1}^{N}(x_i - \mu_x) - (y_i - \mu_y);$$

Wherein, N represents a total number of pixel points of the reconstructed image (a total number of pixel points of the corresponding product image is equal to the total number of pixel points of the reconstructed image), i=1, 2, 3, . . . , N.

A range of the similarity value is [0, 1]. It can be understood that the larger the similarity value is, the reconstructed image is more similar to the corresponding product image. When the similarity value equals 1, it means that the reconstructed image is identical to the corresponding product image.

Wherein, the second preset value can be set according to requirements, which is not limited in this disclosure.

Through the above embodiment, the similarity value between each reconstructed image and the corresponding product image can be calculated. Since the plurality of reconstructed images can act as non-defective images, when the product image corresponding to each reconstructed image is a defective image, the similarity value between the reconstructed image and the defective image is far from 1. When the product image corresponding to each reconstructed image is a non-defective image, the similarity value between the reconstructed image and the non-defective image is close to 1. Therefore, the similarity value can accurately reflected a difference between each reconstructed image and the corresponding product image, so that the detection result is more accurate.

At block S16, the electronic device determines similar images for each learner based on a result of comparison (hereinafter named as "comparison result") between each of the plurality of detection results corresponding to each learner and the annotation result (hereinafter named as "corresponding annotation result") of the product image corresponding each detection result.

In at least one embodiment, each of the similar images refers to the reconstructed image corresponding to a target image, and the target image is a product image corresponding to a detection result that is the same as the annotation result.

In at least one embodiment, the determining the similar images for each learner based on the comparison result between each of the plurality of detection results corresponding to each learner and the corresponding annotation result includes:

Obtaining a plurality of comparison results by comparing each of the plurality of detection results with the corresponding annotation result; for each of the plurality of comparison results, if the comparison result indicates that the detection result is the same as the corresponding annotation result, determining the product image corresponding to the comparison result as a target image, and determining the reconstructed image corresponding to the target image as a similar image.

Through the above-mentioned embodiments, the similar images can be accurately screened out from the plurality of reconstructed images.

At block S17, the electronic device calculates a correct rate of each learner according to the similar images corresponding to each learner, and determines a learner from the plurality of learner as a multi-scale autoencoder according to the correct rate of each learner.

In at least one embodiment, the correct rate of each learner refers to a proportion of the similar images in the plurality of reconstructed images corresponding to each learner, and the correct rate of each learner indicates the correct rate of each learner in detecting the plurality of product images.

The multi-scale autoencoder refers to the learner that generates a most number of similar images.

In at least one embodiment, the calculating of the correct rate of each learner according to the similar images corresponding to each learner, and the determining of the learner from the plurality of learner as the multi-scale autoencoder according to the correct rate of each learner includes:

Determining a first total number of the similar images corresponding to each learner and determining a second total number of the plurality of reconstructed images corresponding to each learner; calculating a ratio of the similar images in the plurality of reconstructed images corresponding to each learner according to the first total number and the second total number; determining the ratio corresponding to each learner as the correct rate of each learner; and determining a learner corresponding to a maximum correct rate from the plurality of learners as the multi-scale autoencoder.

Through the above implementation, the learner corresponding to the maximum correct rate is a leaner generates a most number of similar images. The electronic device determines the learner corresponding to the maximum correct rate as the multi-scale autoencoder corresponding to the image size, it can improve the reconstruction capability of the multi-scale autoencoder.

In at least one embodiment, the electronic device can convert a size of an image of an object to be tested into the image size, then generate an image using the multi-scale autoencoder, and detect whether the object is defective according to the generated image. The object can be any suitable device such as a cup, a pencil, or a box.

It can be seen from the above technical solutions that the size of the feature map generated by each learner can be controlled through the operation results that are obtained based on the image size and each scale, which avoids the problem that the feature map is too large or too small, thereby improving the degree of fineness of extracting the image features, the similar images are selected from the plurality of reconstructed images based on the comparison result of each detection result and the corresponding annotation result, and the correct rate of each learner is calculated based on the similar images, then, the learner with the maximum correct rate is selected as the multi-scale autoencoder corresponding to the image size, because the correct rate can accurately reflect the total number of similar images, and, through the multi-scale autoencoder, the most number of similar images are generated by the multi-scale autoencoder, so the reconstruction ability of the multi-scale autoencoder can be improved, so the feature map generated by the multi-scale autoencoder can accurately restore the reconstructed image.

Figure 4:
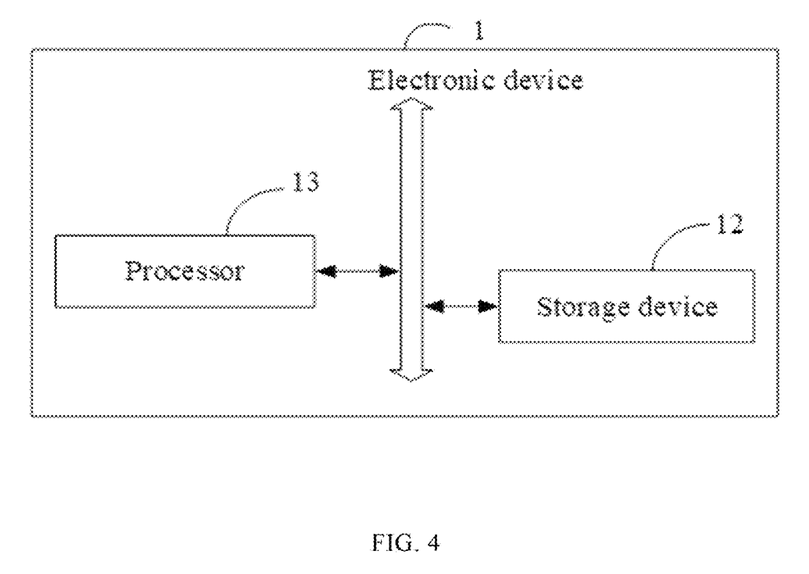
FIG. 4 is a schematic structural diagram of an electronic device implementing an embodiment of the method for generating the multi-scale autoencoder in the present disclosure.

As shown in FIG. 4, it is a structural diagram of an electronic device according to one embodiment of the multi-scale autoencoder generation method of the present disclosure.

In an embodiment of the present disclosure, the electronic device 1 includes, but is not limited to, a storage device 12, a processor 13, and a computer program stored in the storage device 12 and can be executed by the processor 13. For example, the computer program can be a program of generating the multi-scale autoencoder.

Those skilled in the art can understand that the schematic structural diagram is only an example of the electronic device 1, and does not constitute a limitation on the electronic device 1, and may include more or less components than the one shown, or combine some components, or different components, for example, the electronic device 1 may also include input and output devices, network access devices, buses, and the like.

The processor 13 may be a central processing unit (CPU), or other general-purpose processors, a digital signal processor (DSP), an application specific integrated circuit (ASIC), Field-Programmable Gate Array (FPGA) or other programmable logic devices, discrete gate or transistor logic devices, discrete hardware components, etc. The general-purpose processor can be a microprocessor or the processor can also be any conventional processor, etc. The processor 13 is the computing core and control center of the electronic device 1, and uses various interfaces and lines to connect each part of the electronic device 1.

The processor 13 obtains the operating system of the electronic device 1 and obtains various installed applications. The processor 13 obtains the application program to implement each block in the embodiments of the foregoing multi-scale autoencoder generation method, for example, to implement each block shown in FIG. 2.

Exemplarily, the computer program can be divided into one or more modules/units, and the one or more modules/units are stored in the storage device 12 and retrieved by the processor 13 to complete the present disclosure. The one or more modules/units may be a series of computer program instruction segments capable of performing specific functions, and the instruction segments are used to describe the process of acquisition the computer program in the electronic device 1.

The storage device 12 can be used to store the computer programs and/or modules, and the processor 13 executes or obtains the computer programs and/or modules stored in the storage device 12, and calls up the data stored in the storage device 12, such that various functions of the electronic device 1 are realized. The storage device 12 may mainly include an area for storing programs and an area for storing data, wherein the area for storing programs may store an operating system, an application program required for at least one function (such as a sound playback function, an image playback function, etc.), and the like; the area for storing data may store the data created according to the use of the electronic device 1. In addition, the storage device 12 may include non-volatile storage device such as hard disk, internal memory, plug-in hard disk, smart media card (SMC), Secure digital (SD) card, flash card, at least one disk storage device, flash memory device, or other non-volatile solid state storage device.

The storage device 12 may be an external storage device and/or an internal storage device of the electronic device 1. Further, the storage device 12 may be a storage in physical form, such as a memory stick, a trans-flash card, and the like.

If the modules/units integrated in the electronic device 1 are implemented in the form of software functional units and sold or used as independent products, they may be stored in a computer-readable storage medium. Based on this understanding, the present disclosure can implement all or part of the processes in the methods of the above embodiments, and can also be completed by instructing the relevant hardware through a computer program. The computer program can be stored in a computer-readable storage medium, and when the computer program is acquired by the processor, the blocks of the foregoing method embodiments can be implemented.

Wherein, the computer program includes computer program code, and the computer program code may be in the form of source code, object code, obtainable file or some intermediate form, and the like. The computer-readable medium may include: any entity or device capable of carrying the computer program code, recording medium, U disk, removable hard disk, magnetic disk, optical disk, computer memory, read-only memory (ROM).

With reference to FIG. 2, the storage device 12 in the electronic device 1 stores a plurality of instructions to implement the multi-scale autoencoder generation method, and the processor 13 can acquire the plurality of instructions to implement processes of: acquiring a plurality of product images and acquiring an annotation of each of the plurality of product images, an image size of each of the plurality of product images being the same and the plurality of product images comprising a plurality of non-defective images; constructing latent spaces of a plurality of scales; constructing a plurality of autoencoders according to the plurality of latent spaces and the image size of each of the plurality of product images; obtaining a plurality of learners by training each of the plurality of autoencoders based on the plurality of non-defective images; inputting the plurality of product images into each of the plurality of learners and obtaining a plurality of reconstructed images reconstructed by each learner; obtaining a plurality of detection results by detecting whether each of the plurality of product images has defects according to the plurality of reconstructed images corresponding to each learner; determining similar images for each learner based on a comparison result between each of the plurality of detection results corresponding to each learner and a corresponding annotation result; calculating a correct rate of each learner according to the similar images corresponding to each learner, and determining a learner from the plurality of learner as a multi-scale autoencoder according to the correct rate of each learner.

Specifically, for the specific implementation method of the above-mentioned instruction by the processor 13, reference may be made to the description of the relevant blocks in the corresponding embodiment of FIG. 2, and details are not repeated.

In the several embodiments provided in this disclosure, it should be understood that the devices and methods disclosed can be implemented by other means. For example, the device embodiments described above are only schematic. For example, the division of the modules is only a logical function division, which can be implemented in another way.

The modules described as separate parts may or may not be physically separate, and the parts displayed as modules may or may not be physical units, that is, may be located in one place, or may be distributed over multiple network units. Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A multi-scale autoencoder generation method applied to an electronic device, the method comprising:
    acquiring a plurality of product images and acquiring an annotation of each of the plurality of product images, an image size of each of the plurality of product images being the same and the plurality of product images comprising a plurality of non-defective images;
    constructing latent spaces having a plurality of scales;
    constructing a plurality of autoencoders according to the plurality of latent spaces and the image size of each of the plurality of product images;
    obtaining a plurality of learners by training each of the plurality of autoencoders based on the plurality of non-defective images;
    inputting the plurality of product images into each of the plurality of learners and obtaining a plurality of reconstructed images reconstructed by each learner;
    obtaining a plurality of detection results by detecting whether each of the plurality of product images has defects according to the plurality of reconstructed images corresponding to each learner;
    determining similar images for each learner based on a comparison result between each of the plurality of detection results corresponding to each learner and a corresponding annotation result;
    calculating a correct rate of each learner according to the similar images corresponding to each learner, and determining a learner from the plurality of learners as a multi-scale autoencoder according to the correct rate of each learner.

2. The multi-scale autoencoder generation method according to claim 1, wherein constructing the plurality of autoencoders according to the plurality of latent spaces and the image size of each of the plurality of product images comprises:
    iteratively calculating a ratio between the image size and a first preset value, until a plurality of operation results equivalent to the plurality of scales are obtained, each of the plurality of operation results being equivalent to one of the plurality of scales;
    counting a total number of iterations performed for obtaining each of the operation results, establishing a correspondence between each of the operation results and the total number of iterations performed for obtaining each of the operation results;
    for each of the plurality of scales, constructing a first preset number of hidden layers as an encoder network, constructing a second preset number of operation layers as a decoder network, thereby obtaining a plurality of encoder networks and a plurality of decoder networks, the first preset number being equal to the second preset number, the first preset number and the second preset number being equal to the corresponding total number of iterations; and
    generating the plurality of autoencoders according to each of the plurality of encoder networks, each of the decoder network, and each of the latent spaces.

3. The multi-scale autoencoder generation method according to claim 2, wherein each of the first preset number of hidden layers is composed of a convolution layer, a batch normalization layer, and an activation function layer in sequence, and each of the second preset number of operation layers is composed of a deconvolution layer, the batch normalization layer, and the activation function layer in sequence.

4. The multi-scale autoencoder generation method according to claim 2, wherein the inputting of the plurality of product images into each of the plurality of learners and the obtaining of the plurality of reconstructed images comprises:
    inputting each of the plurality of product images into the hidden layers of each learner for feature extraction, and obtaining the feature vector output by each hidden layer, the feature vector output by each hidden layer being an input vector of a next hidden layer;
    determining a feature vector output by a last hidden layer as a latent vector corresponding to each product image;
    inputting the latent vector to the operation layers of each learner for reconstruction, and obtaining a reconstructed vector output by each operation layer, wherein the reconstruction vector output by each operation layer is an input vector of a next operation layer; and
    obtaining the plurality of reconstructed images by performing a mapping processing on each reconstruction vector output by a last operation layer.

5. The multi-scale autoencoder generation method according to claim 1, wherein the obtaining of the plurality of learners by training each of the plurality of autoencoders based on the plurality of non-defective images comprises:

calculating a loss function value of each autoencoder; and obtaining the plurality of learners by performing gradient backpropagation on each autoencoder according to the loss function value, until the loss function value decreases to a lowest value.

6. The multi-scale autoencoder generation method according to claim 1, wherein the obtaining of the plurality of detection results by detecting whether each of the plurality of product images has defects according to the plurality of reconstructed images corresponding to each learner comprises:

calculating a similarity value between each of the plurality of reconstructed images and the corresponding product image;

a calculation formula of the similarity value being:

$$SSIM(x, y) = \frac{(2\mu_x\mu_y + c_1)(2\sigma_{xy} + c_2)}{(\mu_x^2 + \mu_x^2 + c_1)(\sigma_x^2 + \sigma_y^2 + c_2)};$$

$$c_1 = (K_1 L)^2;$$

$$c_2 = (K_2 L)^2;$$

wherein, $SSIM(x, y)$ represents the similarity value, x represents the reconstructed image, y represents the corresponding product image, $\mu_x$ represents an average grayscale value of the reconstructed image, $\mu_y$ represents an average grayscale value of the corresponding product image, $\sigma_x$ represents a grayscale standard deviation of the reconstructed image, $\sigma_y$ represents a grayscale standard deviation of the corresponding product image, and $\sigma_{xy}$ represents a grayscale value covariance between the reconstructed image and the corresponding product image, $c_1$ and $c_2$ represent parameters that maintain a denominator in the similarity value not to be zero, L represents a maximum pixel value of the pixel points in the corresponding product image, $K_1$ and $K_2$ represent preset constants, and $K_1 < 1$, $K_2 < 1$;

if the similarity value is greater than a second preset value, determining that the corresponding product image has no defects; and if the similarity value is less than or equal to the second preset value, determining that the corresponding product image has defects.

7. The multi-scale autoencoder generation method according to claim 1, wherein the determining the similar images for each learner based on the comparison result between each of the plurality of detection results corresponding to each learner and the corresponding annotation result comprises:

obtaining a plurality of comparison results by comparing each of the plurality of detection results with the corresponding annotation result;

for each of the plurality of comparison results, if the comparison result indicates that the detection result is the same as the corresponding annotation result, determining the product image corresponding to the comparison result as a target image, and determining the reconstructed image corresponding to the target image as a similar image.

8. The multi-scale autoencoder generation method according to claim 1, wherein the calculating of the correct rate of each learner according to the similar images corresponding to each learner, and the determining of the learner from the plurality of learner as the multi-scale autoencoder according to the correct rate of each learner comprises:

determining a first total number of the similar images corresponding to each learner and determining a second total number of the plurality of reconstructed images corresponding to each learner;

calculating a ratio of the similar images in the plurality of reconstructed images corresponding to each learner according to the first total number and the second total number;

determining the ratio corresponding to each learner as the correct rate of each learner; and determining a learner corresponding to a maximum correct rate from the plurality of learners as the multi-scale autoencoder.

9. An electronic device comprising:

a storage device;

at least one processor; and the storage device storing one or more programs, which when executed by the at least one processor, cause the at least one processor to:

acquire a plurality of product images and acquire an annotation of each of the plurality of product images, an image size of each of the plurality of product images being the same and the plurality of product images comprising a plurality of non-defective images;

construct latent spaces having a plurality of scales;

construct a plurality of autoencoders according to the plurality of latent spaces and the image size of each of the plurality of product images;

obtain a plurality of learners by training each of the plurality of autoencoders based on the plurality of non-defective images;

input the plurality of product images into each of the plurality of learners and obtain a plurality of reconstructed images reconstructed by each learner;

obtain a plurality of detection results by detecting whether each of the plurality of product images has defects according to the plurality of reconstructed images corresponding to each learner;

determine similar images for each learner based on a comparison result between each of the plurality of detection results corresponding to each learner and a corresponding annotation result;

calculate a correct rate of each learner according to the similar images corresponding to each learner, and determine a learner from the plurality of learners as a multi-scale autoencoder according to the correct rate of each learner.

10. The electronic device according to claim 9, wherein the at least one processor constructs the plurality of autoencoders according to the plurality of latent spaces and the image size of each of the plurality of product images by:

iteratively calculating a ratio between the image size and a first preset value, until a plurality of operation results equivalent to the plurality of scales are obtained, each of the plurality of operation results being equivalent to one of the plurality of scales;

counting a total number of iterations performed for obtaining each of the operation results, establishing a correspondence between each of the operation results and the total number of iterations performed for obtaining each of the operation results;

for each of the plurality of scales, constructing a first preset number of hidden layers as an encoder network, constructing a second preset number of operation layers as a decoder network, thereby obtaining a plurality of encoder networks and a plurality of decoder networks, the first preset number being equal to the second preset number, the first preset number and the second preset number being equal to the corresponding total number of iterations; and generating the plurality of autoencoders according to each of the plurality of encoder networks, each of the decoder network, and each of the latent spaces.

11. The electronic device according to claim 10, wherein each of the first preset number of hidden layers is composed of a convolution layer, a batch normalization layer, and an activation function layer in sequence, and each of the second preset number of operation layers is composed of a deconvolution layer, the batch normalization layer, and the activation function layer in sequence.

12. The electronic device according to claim 10, wherein the at least one processor inputs the plurality of product images into each of the plurality of learners and obtains the plurality of reconstructed images by:

inputting each of the plurality of product images into the hidden layers of each learner for feature extraction, and obtaining the feature vector output by each hidden layer, the feature vector output by each hidden layer being an input vector of a next hidden layer;

determining a feature vector output by a last hidden layer as a latent vector corresponding to each product image;

inputting the latent vector to the operation layers of each learner for reconstruction, and obtaining a reconstructed vector output by each operation layer, wherein the reconstruction vector output by each operation layer is an input vector of a next operation layer; and obtaining the plurality of reconstructed images by performing a mapping processing on each reconstruction vector output by a last operation layer.

13. The electronic device according to claim 9, wherein the at least one processor obtains the plurality of learners by training each of the plurality of autoencoders based on the plurality of non-defective images by:

calculating a loss function value of each autoencoder; and obtaining the plurality of learners by performing gradient backpropagation on each autoencoder according to the loss function value, until the loss function value decreases to a lowest value.

14. The electronic device according to claim 9, wherein the at least one processor obtains the plurality of detection results by detecting whether each of the plurality of product images has defects according to the plurality of reconstructed images corresponding to each learner by:

calculating a similarity value between each of the plurality of reconstructed images and the corresponding product image;

a calculation formula of the similarity value being:

$$SSIM(x, y) = \frac{(2\mu_x\mu_y + c_1)(2\sigma_{xy} + c_2)}{(\mu_x^2 + \mu_x^2 + c_1)(\sigma_x^2 + \sigma_y^2 + c_2)};$$

$$c_1 = (K_1 L)^2;$$

$$c_2 = (K_2 L)^2;$$

wherein, $SSIM(x, y)$ represents the similarity value, x represents the reconstructed image, y represents the corresponding product image, $\mu_x$ represents an average grayscale value of the reconstructed image, $\mu_y$ represents an average grayscale value of the corresponding product image, $\sigma_x$ represents a grayscale standard deviation of the reconstructed image, $\sigma_y$ represents a grayscale standard deviation of the corresponding product image, and $\sigma_{xy}$ represents a grayscale value covariance between the reconstructed image and the corresponding product image, $c_1$ and $c_2$ represent parameters that maintain a denominator in the similarity value not to be zero, L represents a maximum pixel value of the pixel points in the corresponding product image, $K_1$ and $K_2$ represent preset constants, and $K_1 < 1$, $K_2 < 1$;

if the similarity value is greater than a second preset value, determining that the corresponding product image has no defects; and if the similarity value is less than or equal to the second preset value, determining that the corresponding product image has defects.

15. The electronic device according to claim 9, wherein the at least one processor determines the similar images for each learner based on the comparison result between each of the plurality of detection results corresponding to each learner and the corresponding annotation result by:

obtaining a plurality of comparison results by comparing each of the plurality of detection results with the corresponding annotation result;

for each of the plurality of comparison results, if the comparison result indicates that the detection result is the same as the corresponding annotation result, determining the product image corresponding to the comparison result as a target image, and determining the reconstructed image corresponding to the target image as a similar image.

16. The electronic device according to claim 9, wherein the at least one processor calculates the correct rate of each learner according to the similar images corresponding to each learner, and determines the learner from the plurality of learner as the multi-scale autoencoder according to the correct rate of each learner by:

determining a first total number of the similar images corresponding to each learner and determining a second total number of the plurality of reconstructed images corresponding to each learner;

calculating a ratio of the similar images in the plurality of reconstructed images corresponding to each learner according to the first total number and the second total number;

determining the ratio corresponding to each learner as the correct rate of each learner; and determining a learner corresponding to a maximum correct rate from the plurality of learners as the multi-scale autoencoder.

17. A non-transitory storage medium having instructions stored thereon, when the instructions are executed by a processor of an electronic device, the processor is caused to perform a multi-scale autoencoder generation method, wherein the method comprises:

acquiring a plurality of product images and acquiring an annotation of each of the plurality of product images, an image size of each of the plurality of product images being the same and the plurality of product images comprising a plurality of non-defective images;

constructing latent spaces having a plurality of scales;

constructing a plurality of autoencoders according to the plurality of latent spaces and the image size of each of the plurality of product images;

obtaining a plurality of learners by training each of the plurality of autoencoders based on the plurality of non-defective images;

inputting the plurality of product images into each of the plurality of learners and obtaining a plurality of reconstructed images reconstructed by each learner;

obtaining a plurality of detection results by detecting whether each of the plurality of product images has defects according to the plurality of reconstructed images corresponding to each learner;

determining similar images for each learner based on a comparison result between each of the plurality of detection results corresponding to each learner and a corresponding annotation result;

calculating a correct rate of each learner according to the similar images corresponding to each learner, and determining a learner from the plurality of learners as a multi-scale autoencoder according to the correct rate of each learner.

18. The non-transitory storage medium according to claim 17, wherein constructing the plurality of autoencoders according to the plurality of latent spaces and the image size of each of the plurality of product images comprises:

iteratively calculating a ratio between the image size and a first preset value, until a plurality of operation results equivalent to the plurality of scales are obtained, each of the plurality of operation results being equivalent to one of the plurality of scales;

counting a total number of iterations performed for obtaining each of the operation results, establishing a correspondence between each of the operation results and the total number of iterations performed for obtaining each of the operation results;

for each of the plurality of scales, constructing a first preset number of hidden layers as an encoder network, constructing a second preset number of operation layers as a decoder network, thereby obtaining a plurality of encoder networks and a plurality of decoder networks, the first preset number being equal to the second preset number, the first preset number and the second preset number being equal to the corresponding total number of iterations; and generating the plurality of autoencoders according to each of the plurality of encoder networks, each of the decoder network, and each of the latent spaces.

19. The non-transitory storage medium according to claim 18, wherein each of the first preset number of hidden layers is composed of a convolution layer, a batch normalization layer, and an activation function layer in sequence, and each of the second preset number of operation layers is composed of a deconvolution layer, the batch normalization layer, and the activation function layer in sequence.

20. The non-transitory storage medium according to claim 19, wherein the inputting of the plurality of product images into each of the plurality of learners and the obtaining of the plurality of reconstructed images comprises:

inputting each of the plurality of product images into the hidden layers of each learner for feature extraction, and obtaining the feature vector output by each hidden layer, the feature vector output by each hidden layer being an input vector of a next hidden layer;

determining a feature vector output by a last hidden layer as a latent vector corresponding to each product image;

inputting the latent vector to the operation layers of each learner for reconstruction, and obtaining a reconstructed vector output by each operation layer, wherein the reconstruction vector output by each operation layer is an input vector of a next operation layer; and obtaining the plurality of reconstructed images by performing a mapping processing on each reconstruction vector output by a last operation layer.

* * * * *